US007657492B2

(12) United States Patent
Rieger et al.

(10) Patent No.: US 7,657,492 B2
(45) Date of Patent: Feb. 2, 2010

(54) MOBILE CONTROL AND MONITORING SYSTEM

(75) Inventors: Gottfried Rieger, Fürth (DE); Ulrich Sinn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 201 days.

(21) Appl. No.: 10/571,282

(22) PCT Filed: Aug. 23, 2004

(86) PCT No.: PCT/EP2004/009412

§ 371 (c)(1),
(2), (4) Date: Mar. 9, 2006

(87) PCT Pub. No.: WO2005/036492

PCT Pub. Date: Apr. 21, 2005

(65) Prior Publication Data

US 2007/0038341 A1 Feb. 15, 2007

(30) Foreign Application Priority Data

Sep. 17, 2003 (DE) ................................ 103 43 251

(51) Int. Cl.
*G06F 17/00* (2006.01)
*G06F 17/20* (2006.01)

(52) U.S. Cl. ............................... 706/11; 700/4; 700/23; 700/97; 707/1; 707/4; 715/965

(58) Field of Classification Search ................... 700/83, 700/23; 701/24; 707/4
See application file for complete search history.

(56) References Cited

U.S. PATENT DOCUMENTS 5,450,068 A 9/1995 Steffen (Continued)

FOREIGN PATENT DOCUMENTS

DE 42 21 793 C1 2/1994

(Continued)

OTHER PUBLICATIONS

Karl-Heinz Weber, Bodo Thieme; "Ein tragbares Funk-Fernsteuergerät für Gewinnungsmaschinen"; Apr. 13, 1967; pp. 375-378; XP-002093388; ISSN: 0340-7896; Gluckauf, Verlag Gluckhauf, Essen, Germany.

*Primary Examiner*—David R Vincent
*Assistant Examiner*—Kalpana Bharadwaj

(57) ABSTRACT

The HMI system is provided with a mobile control and monitoring device for automation components of a technical system. It comprises means for contactless data transmission between the mobile control and monitoring device and the automation components, a manual device for triggering or blocking security relevant operations of the technical system and means for locating the mobile control and monitoring device. Evaluation means are provided for managing an active operational area and which activate the automation components for security-relevant operations of the technical system via the mobile control and monitoring device solely when the manual device is released and the locating means detect that the mobile control and monitoring device is located inside the active operational area, the advantage thereof being that manual triggering of security-relevant operations by an operator is the condition upon which they can be activated via the mobile control and monitoring device. If the manual device is placed directly on the housing of the technical system, for example, an operator has to approach in such a way that he/she enters the active operation are in a secure manner.

7 Claims, 1 Drawing Sheet

U.S. PATENT DOCUMENTS

| | | | | |
|---|---|---|---|---|
| 5,600,323 | A | 2/1997 | Boschini | |
| 2001/0035729 | A1* | 11/2001 | Graiger et al. | 318/587 |
| 2003/0013438 | A1* | 1/2003 | Darby | 455/419 |
| 2005/0021158 | A1* | 1/2005 | De Meyer et al. | 700/23 |

FOREIGN PATENT DOCUMENTS

| | | | |
|---|---|---|---|
| DE | 196 00 791 | A1 | 7/1997 |
| DE | 100 41 109 | A1 | 3/2002 |
| EP | 0 406 070 | A1 | 1/1991 |
| EP | 0 629 758 | B1 | 12/1994 |
| EP | 1 004 230 | A2 | 5/2000 |
| WO | WO 96/24120 | A1 | 8/1996 |

* cited by examiner

MOBILE CONTROL AND MONITORING SYSTEM

CROSS REFERENCE TO RELATED APPLICATIONS

This application claims priority to the German application No. 10343251.5, filed Sep. 17, 2003, and to the International Application No. PCT/EP2004/009412, filed Aug. 23, 2004 which are incorporated by reference herein in their entirety.

FIELD OF INVENTION

The invention relates to an HMI system with at least one mobile control and monitoring device for the automation components of a technical unit.

BACKGROUND OF INVENTION

Technical units are all types of technical devices and systems both arranged individually and networked for data purposes, e.g. via a field bus. In the case of industrial applications these include individual operating means, e.g. drives, processing machines. However a technical unit can also be a production unit, in which an overall technical process is operated using locally distributed operating means, e.g. a chemical unit or production line. Technical units are controlled and operated using specific digital data processing systems, also referred to as automation components. In such a system on the one hand there are components used for direct control of the technical unit, i.e. programmable logic controllers PLC. To reduce the load on these controllers, automation systems have further specific devices, which form an interface for operating personnel. These are referred to as control and monitoring devices or HMI or Human Machine Interface devices.

The term HMI device is a generic term covering all components associated with this group of devices. One example is operator panels or OPs. These can be stationary or mobile. HMI devices are used in networked automation as aids for operating personnel so that they can display and control process data of the technical unit to be controlled. This function is referred to as Supervisor Control and Data Acquisition (SCADA). To this end the HMI device generally has specific hardware. In other words it has a touchscreen for example and is specifically screened from environmental influences. Specific software is also operated therein. This provides functions, which enhance user-friendliness, quality and safety of operation by an operator. Thus HMI devices can be used to visualize, control, configure and generate interactive process maps of the technical unit to be operated. On the one hand this allows the selective display of responses of the technical unit, generally in the form of measured values and messages. On the other hand the customized predefinition of control operations and data inputs allows the technical unit to be switched to required states.

SUMMARY OF INVENTION

HMI devices are frequently permanently integrated, for example in the form of terminals, as stationary components in an automation system. Such terminals are then generally connected permanently to the automation system via cable connections. If these terminals are in the form of hand-held devices, their radius of action is limited by a connecting cable. In many instances this ensures that an operator can only carry out safety-relevant operations in direct proximity to the technical unit or at least when there is adequate visual contact.

However the situation is different when an HMI device is in the form of a mobile operator panel. Such a mobile control and monitoring device can for example be connected to the automation system via a radio link with a wide range. In such an instance it cannot be excluded that an operator using a mobile control and monitoring device moves so far from an associated technical unit that safety-relevant operations are carried out from a distance that is per se not permitted. In such an instance personal safety could not be ensured.

An object of the invention is therefore to develop an HMI system further such that it is possible to carry out safety-relevant operations at a technical unit and still comply with the requirements for adequate personal safety even with mobile control and monitoring devices.

The object is achieved by the claims.

The HMI system has at least one mobile control and monitoring device for the automation components of a technical unit. It has means for contactless data trans mission between the mobile control and monitoring device and the automation components, a manual device for releasing or blocking safety-relevant operations of the technical unit and means for locating the mobile control and monitoring device. Evaluation means are also provided for managing an active operating area, which activate the automation components for safety-relevant operations of the technical unit via the mobile control and monitoring device only when the manual device is released and the locating means detect that the mobile control and monitoring device is located inside the active operating area.

The claimed HMI system has the advantage that the manual release of safety-relevant operations by an operator is a precondition for them being activated and implemented via the mobile control and monitoring device and the automation components. In particular if the manual device for the release or blocking of safety-relevant operations is attached directly to a housing of the technical unit or at least in its immediate vicinity, an operator must first approach the unit such that they enter its active operating area. Generally the active operating area of a technical unit will be in its immediate spatial vicinity and surround it for example in as circular a manner as possible. If the manual device is now released by the operator, all the conditions for the activation of safety-relevant operations are complied with for a mobile control and monitoring device carried by the operator. The evaluation means present according to the invention for managing the active operating area can then work in conjunction with the locating means to identify that the carried mobile control and monitoring device is actually located inside the active operating area. It is now ensured that the operator is in adequate proximity to the technical unit and safety-relevant operations can run under their supervision.

In one embodiment of the invention the locating means evaluate the distance between the mobile control and monitoring device and the technical unit in order to be able to detect whether the mobile control and monitoring device is located inside the active operating area. The distance can thereby be measured for example with the aid of the contactless data transmission link, which connects the automation components and the mobile control and monitoring device together for data purposes. Radio links are particularly suitable for this.

In another embodiment of the invention the locating means evaluate the position of the mobile control and monitoring device. A precise position value, which is available for example in the form of suitable surface coordinates, makes it possible also for the evaluation means to determine whether or not a mobile control and monitoring device is located inside the active operating area.

In a further advantageous embodiment of the claimed HMI system, the evaluation means also manage a warning area located outside the active operating area. The warning area advantageously surrounds the active operating area in a circular manner. The evaluation means output a warning message to the mobile control and monitoring device, when the locating means detect that the mobile control and monitoring device is located inside the warning area. In an alternative embodiment the evaluation means output a warning message to the mobile control and monitoring device, when the locating means detect that the mobile control and monitoring device is located inside the warning area after being located inside the active operating area.

These two embodiments have the advantage that a large but still tolerable distance from the technical unit is signaled to the operator via the mobile control and monitoring device they are carrying. This is initiated by once again leaving the warning area where possible in the direction of the active operating area. In the alternative embodiment it can even be identified that an operator is moving away from the technical unit possibly inadvertently and without realizing it and has thereby left the active operating area. This can be signaled for example by a correspondingly configured message on the mobile control and monitoring device.

In an emergency the evaluation means of the claimed HMI system bloc k the automation components for safety-relevant operations of the technical unit via the mobile control and monitoring device, when the manual device is released but the locating means detect that the mobile control and monitoring device is located outside the active operating area. With the above embodiment of the invention, with which an additional warning area surrounds the active operating area preferably in a circular manner, the evaluation means carry out a corresponding blocking operation, when the manual device is released but the locating means detect that the mobile control and monitoring device is located outside the warning area.

BRIEF DESCRIPTION OF THE DRAWING

The invention is described in more detail below with reference to an exemplary embodiment shown in FIG. 1.

DETAILED DESCRIPTION OF INVENTION

Figure 1:
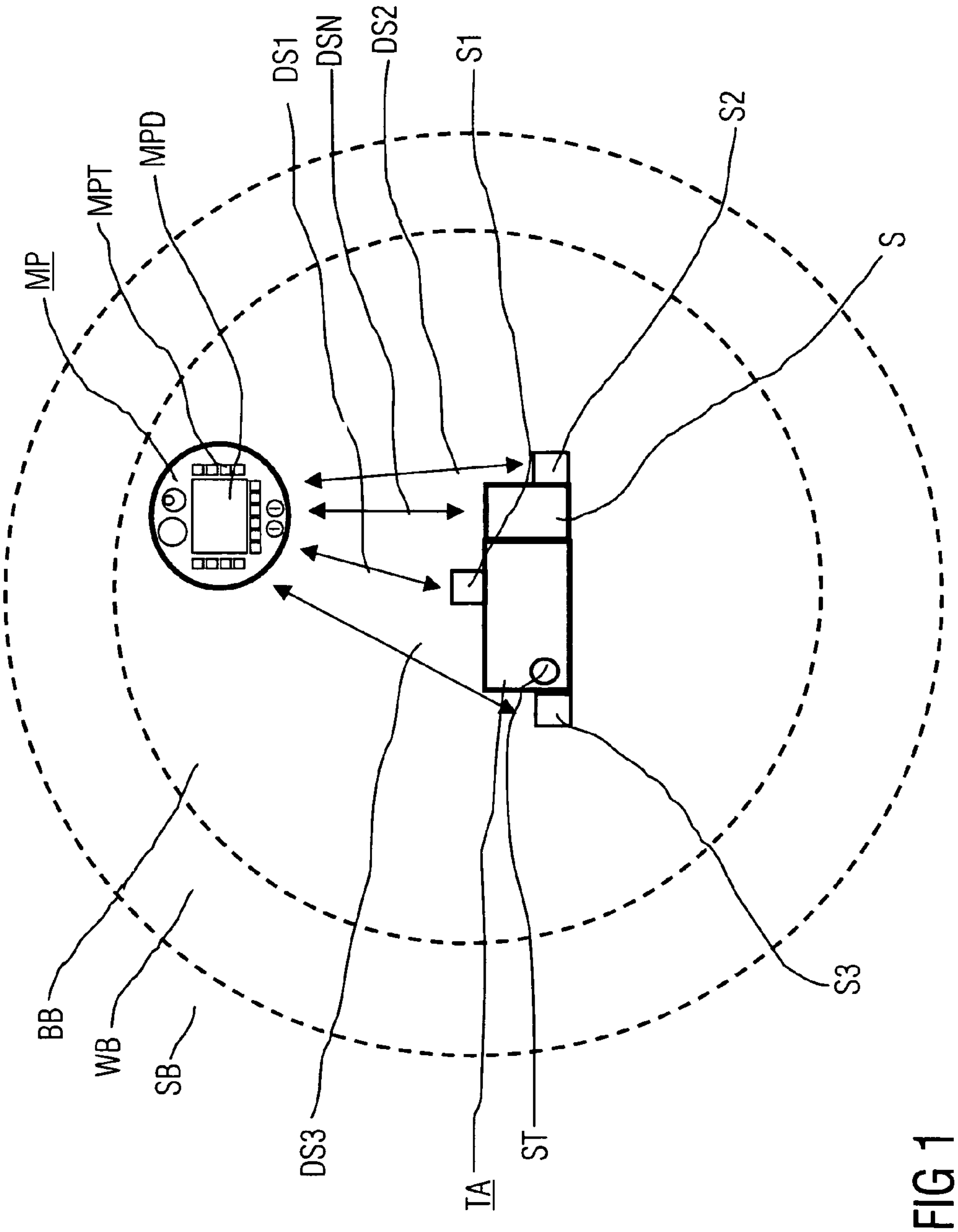
FIG. 1 shows a technical unit TA with technical operating means, which may for example be part of a manufacturing or process engineering system. Automation components S are present to control said technical unit and these act on the technical operating means, in particular by means of measuring transducers, position controllers and other different so-called process instruments. The automation components S in FIG. 1 by way of example have an automation device, e.g. a programmable logic controller, to control the technical operating means, optionally in real time.

At least one mobile control and monitoring device MP is present, to control and monitor the automation components S and for example control, diagnosis, alarm processing and long-term monitoring processes operating therefrom. This can be configured for example as a cableless handheld terminal and can for example have a display MPD and a keyboard MPT. Emergency, disconnect and acknowledge switches and key switches can also be provided. The mobile control and monitoring device MP exchanges useful data with the automation components S of the technical unit TA in a contactless manner via a radio link DSN. An operator using the control and monitoring device MP can therefore display measured values from the technical unit on the display MPD of the control and monitoring device MP or input control commands using its keyboard MPT and send these to the automation components S.

According to the invention evaluation means manage at least one active operating area BB, which in the example in FIG. 1 runs approximately radially around the technical unit TA at its center. These evaluation means advantageously represent a software process, which is handled by the automation components S. It is a first precondition for being able to release safety-relevant operations that a mobile control and monitoring device MP used by an operator is located inside the active operating area BB. This precondition is complied with in the example in FIG. 1, with only the control and monitoring device MP and not the operator being shown in FIG. 1 for greater clarity.

To this end claimed means for locating the mobile control and monitoring device MP are present, which are advantageously also managed by the automation components S. In a first embodiment the locating means evaluate the distance between the mobile control and monitoring device MP and the technical unit TA. In the example in FIG. 1 there is also a further radio link DS1 between the mobile control and monitoring device MP and a transmit and receive device S1 located for example on the housing of the technical unit TA. This is used solely to measure distance. In another embodiment of the invention in some circumstances it is also possible for the distance to be measured with the aid of the radio link DSN used for the transmission of useful data. In a further embodiment of the invention the locating means evaluate the position of the mobile control and monitoring device MP. In the example in FIG. 1 there are two further transmit and receive devices S2, S3 for this purpose in addition to the transmit and receive device S1. These three elements allow precise determination of the current position of the mobile control and monitoring device MP, for example in surface coordinates. The evaluation means can therefore detect whether or not the mobile control and monitoring device MP is located inside the active operating area BB.

As a further precondition for being able to release safety-relevant operations, according to the invention a manual device serving to release or block safety-relevant operations of the technical unit TA must be released by an operator. In the example in FIG. 1 such a manual device is attached directly to a housing of the technical unit TA preferably in the form of a switch. In practice the claimed HMI system therefore ensures that an operator does not just enter the active operating area BB with a mobile control and monitoring device but they also actively release the manual device ST before the automation components S for safety-relevant operations of the technical unit TA can be activated via the mobile control and monitoring device MP.

In a further embodiment already shown in the example in FIG. 1, the evaluation means also manage a warning area WB located outside the active operating area BB and output a warning message to the mobile control and monitoring device MP when the locating means detect that the mobile control and monitoring device MP is located inside the warning area WB. In the example shown in FIG. 1, the warning area WB runs approximately radially around the technical unit TA at its center. Depending on the respective application, the evaluation means can also be set such that a warning message is output to the mobile control and monitoring device MP when the locating means detect that the mobile control and monitoring device MP is located inside the warning area WB after being located inside the active operating area BB. This occurs when an operator has entered the active operating area and released the manual device ST preferably directly on the housing of the technical unit but then moves too far away from the unit TA either unheedingly or from negligence.

In a further embodiment of the invention the evaluation means can finally be set such that they optionally block the automation components S for safety-relevant operations of the technical unit TA via the mobile control and monitoring device MP again, when the manual device is released but the locating means detect that the mobile control and monitoring device MP is located outside the active operating area BB or even outside the warning area WB.

The invention claimed is:

1. A method to perform safety-relevant operations at a technical unit, comprising:

providing a Human Machine Interface (HMI) system with at least one mobile control and monitoring device for automation components of a technical unit, wherein a data transmission between the mobile control and monitoring device and the automation components is contactless;

providing a manual device for releasing or blocking safety-relevant operations of the technical unit;

providing a locating device for locating the mobile control and monitoring device;

providing an evaluation device to manage an active operating area, and to activate the automation components for safety-relevant operations of the technical unit via the mobile control only when the manual device is released by an operator and the locating means detects that the mobile control and monitoring device is located inside an active operating area; and generating a warning signal when the mobile control and monitoring device is in a warning area located outside the active operating area, wherein the manual release of safety-relevant operations is performed by an operator, wherein the manual release is a precondition for them being activated.

2. The method as claimed in claim 1, wherein when the manual device for the release or blocking of safety-relevant operations is attached directly to a housing of the technical unit.

3. The method as claimed in claim 2, wherein for the release or blocking of safety-relevant operations an operator first approaches the unit.

4. The method as claimed in claim 1, wherein when the manual device for the release or blocking of safety-relevant operations is attached in an immediate vicinity of the technical unit, wherein an operator first approaches the unit such that the operator enters its active operating area.

5. The method as claimed in claim 2, wherein when the manual device is released by the operator, all conditions for the activation of safety-relevant operations are complied with for the mobile control and monitoring device carried by the operator when the mobile control and monitoring device is located inside the active operating area.

6. The method as claimed in claim 4, wherein when the manual device is released by the operator, all conditions for the activation of safety-relevant operations are complied with for the mobile control and monitoring device carried by the operator when the mobile control and monitoring device is located inside the active operating area.

7. The method as claimed in claim 4, wherein the active operating area being an area generally surrounding the technical unit and in which a safety of the operator is ensured while the safety-relevant operations are executed.

* * * * *